United States Patent
Tang et al.

(10) Patent No.: US 9,805,448 B2
(45) Date of Patent: Oct. 31, 2017

(54) METHOD AND APPARATUS FOR COMPUTED TOMOGRAPHY USING ASYMETRIC FILTER FOR VOLUME HALF RECONSTRUCTION

(71) Applicant: TOSHIBA MEDICAL SYSTEMS CORPORATION, Otawara-shi (JP)

(72) Inventors: Qiulin Tang, Mundelein, IL (US); Satoru Nakanishi, Arlington Heights, IL (US)

(73) Assignee: TOSHIBA MEDICAL SYSTEMS CORPORATION, Otawara-shi (JP)

( * ) Notice: Subject to any disclaimer, the term of this patent is extended or adjusted under 35 U.S.C. 154(b) by 80 days.

(21) Appl. No.: 14/632,792

(22) Filed: Feb. 26, 2015

(65) Prior Publication Data

US 2016/0253818 A1  Sep. 1, 2016

(51) Int. Cl.
*G06K 9/00* (2006.01)
*G06T 5/00* (2006.01)
*G06T 5/10* (2006.01)
*G06T 5/50* (2006.01)
*G06T 11/00* (2006.01)

(52) U.S. Cl.
CPC ............ *G06T 5/008* (2013.01); *G06T 5/10* (2013.01); *G06T 5/50* (2013.01); *G06T 11/008* (2013.01); *G06T 2207/10081* (2013.01); *G06T 2207/20056* (2013.01); *G06T 2207/30048* (2013.01)

(58) Field of Classification Search
CPC ............... G06T 11/203; G06T 11/60; G06T 2207/10081; G06T 2207/30048; G06T 2207/30101; G06T 5/001; G06T 7/0081; G06T 7/0097; G06T 7/20
See application file for complete search history.

(56) References Cited

U.S. PATENT DOCUMENTS

| | | | | |
|---|---|---|---|---|
| 2009/0028288 A1* | 1/2009 | Horiuchi | ............... | A61B 6/032 378/4 |
| 2013/0083986 A1* | 4/2013 | Zeng | ....................... | G06K 9/46 382/131 |
| 2013/0170609 A1* | 7/2013 | Nett | ........................ | G06T 5/001 378/4 |
| 2015/0213633 A1* | 7/2015 | Chang | .................. | G01N 23/046 382/284 |
| 2015/0228092 A1* | 8/2015 | Claus | .................... | G06T 11/006 382/131 |

* cited by examiner

*Primary Examiner* — Bhavesh Mehta
*Assistant Examiner* — Ian Lemieux
(74) *Attorney, Agent, or Firm* — Oblon, McClelland, Maier & Neustadt, L.L.P.

(57) ABSTRACT

An apparatus and method of processing cone-beam X-ray projection data using a short-scan method (e.g., filtered back projection and weighting the projection data using the Parker weights for projection angles spanning 180° plus the fan angle) to reconstruct an image. Imaging artifacts in the short-scan image are corrected by combining the short scan image with a correction image. The correction image is obtained by applying an asymmetric filter to the difference between the short-scan image and a full-scan image, the full scan image being obtained using image reconstruction of the full-scan projection data. In one implementation, the asymmetric filter is a low-pass filter that, in the spatial domain, is foreshortened along a center-view axis corresponding to the short scan.

19 Claims, 14 Drawing Sheets

Direction of Half Scan

METHOD AND APPARATUS FOR COMPUTED TOMOGRAPHY USING ASYMETRIC FILTER FOR VOLUME HALF RECONSTRUCTION

BACKGROUND

Field

This disclosure relates to computed tomography (CT) image reconstruction of X-ray projection data obtained using a CT scanner, and more particularly relates to image reconstruction using short scan projection data and correcting for artifacts in the short-scan image.

Description of the Related Art

Computed tomography (CT) systems and methods are widely used, particularly for medical imaging and diagnosis. CT systems generally create images of one or more sectional slices through a subject's body. A radiation source, such as an X-ray source, irradiates the body from one side. A collimator, generally adjacent to the X-ray source, limits the angular extent of the X-ray beam, so that radiation impinging on the body is substantially confined to a cone-beam/fan-beam region (i.e., an X-ray projection volume) defining an image volume of the body. At least one detector (and generally many more than one detector) on the opposite side of the body receives radiation transmitted through the body substantially in the projection volume. The attenuation of the radiation that has passed through the body is measured by processing electrical signals received from the detector.

Making projective measurements at a series of different projection angles through the body, a sinogram can be constructed from the projection data, with the spatial dimension of the detector array along one axis and the time/angle dimension along the other axis. In parallel beam CT, the attenuation resulting from a particular volume within the body will trace out a sine wave oscillating along the spatial dimension of the sinogram, with the sine wave being centered on the axis of rotation for the CT system.

The process of X-ray projection measurements of the 3-dimensional object onto a 2-dimensional measurement plane (or a 2-dimensional object onto a 1-dimensional measurement plane) can be represented mathematically as a Radon transformation $$g(X,Y)=R[f(x,y,z)],$$

where $g(X,Y)$ is the projection data as a function of position along a detector array, $f(x,y,z)$ is the attenuation of the object as a function of position, and $R[\bullet]$ is the Radon transform. Having measured projection data at multiple angles, the image reconstruction problem can be expressed by calculating the inverse Radon transformation of the projection data $$f(x,y,z)=R^{-1}[g(X,Y,\theta)],$$

where $R^{-1}[\bullet]$ is the inverse Radon transform and $\theta$ is the projection angle at which the projection data was acquired. In practice, there are many methods for reconstructing an image $f(x,y,z)$ from the projection data $g(X,Y,\theta)$.

Often the image reconstruction problem will be formulated as a matrix equation $$Af=g,$$

where g represents the projection measurements of the X-rays transmitted through an object space including the object OBJ, A is the system matrix describing the discretized line integrals (i.e., the Radon transforms) of the X-rays through the object space, and $f$ is the image of object OBJ (i.e., the quantity to be solved for by solving the system matrix equation). The image $f$ is a map of the attenuation as a function of position. Image reconstruction can be performed by taking the matrix inverse or pseudo-inverse of the matrix A. However, this rarely is the most efficient method for reconstructing an image. The more conventional approach is called filtered back projection (FBP), which consistent with the name, entails filtering the projection data and then back projecting the filtered projection data onto the image space, as expressed by $$f(x,y,z)=BP[g(X,Y,\theta)*F_{Ramp}(X,Y)].$$

where $F_{Ramp}(X,Y)$ is a ramp filter (the name "ramp filter" arises from its shape in the spatial-frequency domain), the symbol * denotes convolution, and $BP[\bullet]$ is the back projection function. Other methods of image reconstruction include: iterative reconstruction methods (e.g., the algebraic reconstruction technique (ART) method and the total variation minimization regularization methods), Fourier-transform-based methods (e.g., direct Fourier method), and statistical methods (e.g., maximum-likelihood expectation-maximization algorithm based methods).

In some applications of cone-beam (CB) CT, half-scan reconstruction may be preferable to full-scan reconstruction in order to obtain better time resolution. Better time resolution time is achieved because the time required for a half scan (i.e., scanning projection angles spanning $180°+\phi$, where $\phi$ is the fan angle of the cone-beam/fan-beam) is less than the time required to perform a full scan. This improved time resolution is especially important for imaging moving objects, such as a beating heart in cardiac CT.

The image reconstruction methods for half-scan CT reconstruction generally differ from full-scan CT reconstruction due to unequal data redundancy for projection rays through the imaged object. Whereas full-scan CT image reconstruction uses conventional filtered back projection to reconstruct images, wherein each projection angle is weighted equally, short-scan CT image reconstruction includes variable weighting depending on the projection angle to correct for the fact that the short scan represents an unequal sampling of the image object—i.e., unequal data redundancy. There are various approaches to account for variations in the data redundancy, including: the Dreike-Boyd parallel rebinning algorithms, complementary rebinning algorithms, applying suitable weighting function such as the Parker weights to the sinogram, and hybrid techniques.

One drawback of half-scan is that the non-uniformity of data redundancy can lead to low-frequency cone-beam artifacts. As shown in FIG. 2, these artifacts often show up as shading on one side of the reconstructed image.

BRIEF DESCRIPTION OF THE DRAWINGS

A more complete understanding of this disclosure is provided by reference to the following detailed description when considered in connection with the accompanying drawings, wherein.

DETAILED DESCRIPTION

Figure 1:
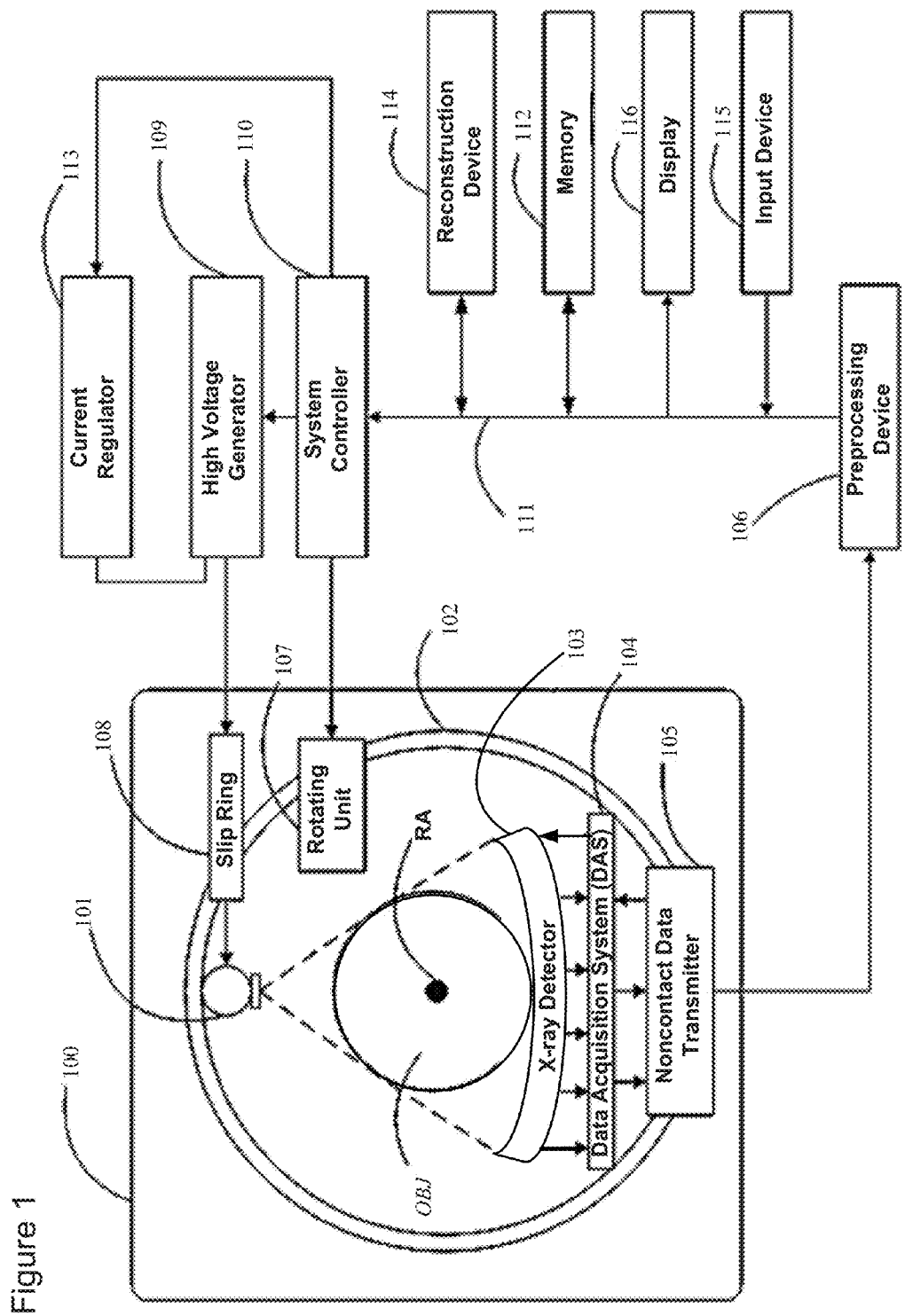
FIG. 1 shows a schematic of an implementation of a computed tomography scanner.

In one embodiment, there is provided a computed-tomography (CT) apparatus, comprising: (1) a radiation source radiating radiation into an object space; (2) a plurality of detector elements configured to detect the radiation transmitted from the radiation source and through the object space, the plurality of detector elements configured to generate projection data; (3) a rotation mount configured to rotate the radiation source around the object space, wherein the radiation source is fixedly connected to the rotation mount; and (4) processing circuitry configured to (a) obtain the projection data representing an irradiance of the radiation detected at the plurality of detectors, the radiation having been transmitted through the object space, (b) reconstruct a full-scan image using the projection data, (c) reconstruct a short-scan image using the projection data, (d) generate a difference image by obtaining a difference between the full-scan image and the short-scan image, (e) filter the difference image using an asymmetric filter, and (f) combine the filtered difference image with the short-scan image to obtain a corrected short-scan image.

In another embodiment, there is provided a computed-tomography (CT) apparatus, comprising: (1) a radiation source radiating radiation into an object space; (2) a plurality of detector elements configured to detect the radiation transmitted from the radiation source and through the object space, the plurality of detector elements configured to generate projection data; (3) a rotation mount configured to rotate the radiation source around the object space, wherein the radiation source is fixedly connected to the rotation mount; and (4) processing circuitry configured to (a) obtain the projection data representing an irradiance of the radiation detected at the plurality of detectors, the radiation having been transmitted through the object space, (b) calculate first weighted data by weighting the projection data using short-scan weights, (c) calculate second weighted data by weighting the projection data using difference weights representing a difference between full-scan weights and the short-scan weights, (d) filter the second weighted data using a view-dependent filter, (e) combine the first weighted data with the filtered second weighted data to obtain combined weighted data, and (f) reconstruct an image from the combined weighted data using a computed-tomography image reconstruction method.

In another embodiment, there is provided an image-processing apparatus, comprising: (1) an interface configured to receive projection data representing an irradiance of radiation detected at a plurality of detectors; and (2) processing circuitry configured to (a) reconstruct a full-scan image using the projection data, (b) reconstruct a short-scan image using the projection data, (c) generate a difference image by obtaining a difference between the full-scan image and the short-scan image, (d) filter the difference image using an asymmetric filter, and (e) combine the filtered difference image with the short-scan image to obtain a corrected short-scan image.

Referring now to the drawings, wherein like reference numerals designate identical or corresponding parts throughout the several views, FIG. 1 illustrates an implementation of the radiography gantry included in a CT apparatus or scanner. As shown in FIG. 1, a radiography gantry 100 is illustrated from a side view and further includes an X-ray tube 101, an annular frame 102, and a multi-row or two-dimensional-array-type X-ray detector 103. The X-ray tube 101 and X-ray detector 103 are diametrically mounted across a object OBJ on the annular frame 102, which is rotatably supported around a rotation axis RA. A rotating unit 107 rotates the annular frame 102 at a high speed, such as 0.4 sec/rotation, while the object OBJ is being moved along the axis RA into or out of the illustrated page.

The first embodiment of an X-ray computed tomography apparatus according to the present inventions will be described below with reference to the views of the accompanying drawing. Note that X-ray computed tomography apparatuses include various types of apparatuses, e.g., a rotate/rotate-type apparatus in which an X-ray tube and X-ray detector rotate together around an object to be examined, and a stationary/rotate-type apparatus in which many detection elements are arrayed in the form of a ring or plane, and only an X-ray tube rotates around an object to be examined. The present inventions can be applied to either type. In this case, the rotate/rotate type, which is currently the mainstream, will be exemplified.

The multi-slice X-ray CT apparatus further includes a high voltage generator 109 that generates a tube voltage applied to the X-ray tube 101 through a slip ring 108 so that the X-ray tube 101 generates X-rays. The X-rays are emitted towards the object OBJ, whose cross sectional area is represented by a circle. The X-ray detector 103 is located at an opposite side from the X-ray tube 101 across the object OBJ for detecting the emitted X-rays that have transmitted through the object OBJ. The X-ray detector 103 further includes individual detector elements or units.

The CT apparatus further includes other devices for processing the detected signals from X-ray detector 103. A data acquisition circuit or a Data Acquisition System (DAS) 104 converts a signal output from the X-ray detector 103 for each channel into a voltage signal, amplifies the signal, and further converts the signal into a digital signal. The X-ray detector 103 and the DAS 104 are configured to handle a predetermined total number of projections per rotation (TPPR). Examples of TPPRs include, but are not limited to 900 TPPR, 900-1800 TPPR, and 900-3600 TPPR.

The above-described data is sent to a preprocessing device 106, which is housed in a console outside the radiography gantry 100 through a non-contact data transmitter 105. The preprocessing device 106 performs certain corrections, such as sensitivity correction on the raw data. A memory 112 stores the resultant data, which is also called projection data at a stage immediately before reconstruction processing. The memory 112 is connected to a system controller 110 through a data/control bus 111, together with a reconstruction device 114, input device 115, and display 116. The system controller 110 controls a current regulator 113 that limits the current to a level sufficient for driving the CT system.

The detectors are rotated and/or fixed with respect to the patient among various generations of the CT scanner systems. In one implementation, the above-described CT system can be an example of a combined third-generation geometry and fourth-generation geometry system. In the third-generation system, the X-ray tube 101 and the X-ray detector 103 are diametrically mounted on the annular frame 102 and are rotated around the object OBJ as the annular frame 102 is rotated about the rotation axis RA. In the fourth-generation geometry system, the detectors are fixedly placed around the patient and an X-ray tube rotates around the patient. In an alternative embodiment, the radiography gantry 100 has multiple detectors arranged on the annular frame 102, which is supported by a C-arm and a stand.

In what follows, a detailed description of the embodiments used to reduce shading artifacts in short-scan reconstruction methods in CT is provided. In addition to conventional CT, the embodiments described herein are also applicable to a fourth generation CT system, a third generation CT system and/or a combination of third and fourth generation CT systems. Specifically, the embodiments described herein are also applicable to a CT system that does not include any photon-counting-detectors.

The memory 112 can store the measurement value representative of the irradiance of the X-rays at the X-ray detector unit 103. Further, the memory 112 can store a dedicated program for executing the CT image reconstruction methods and short-scan reconstruction methods 400, 500, 900, 1100, 1200, and 1300 discussed herein.

The reconstruction device 114 can execute the CT image reconstruction methods and short-scan reconstruction methods 400, 500, 900, 1100, 1200, and 1300 discussed herein. Further, reconstruction device 114 can execute pre-reconstruction processing image processing such as volume rendering processing and image difference processing as needed.

The pre-reconstruction processing of the projection data performed by the preprocessing device 106 can include correcting for detector calibrations, detector nonlinearities, polar effects, noise balancing, and material decomposition.

Post-reconstruction processing performed by the reconstruction device 114 can include filtering and smoothing the image, volume rendering processing, and image difference processing as needed. The image reconstruction process can be performed using filtered back projection, iterative image reconstruction methods, or stochastic image reconstruction methods. The reconstruction device 114 can use the memory 176 to store, e.g., projection data, reconstructed images, calibration data and parameters, and computer programs.

The reconstruction device 114 can include a CPU that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog, or any other hardware description language and the code may be stored in an electronic memory directly within the FPGA or CPLD, or as a separate electronic memory. Further, the memory 112 can be non-volatile, such as ROM, EPROM, EEPROM or FLASH memory. The memory 112 can also be volatile, such as static or dynamic RAM, and a processor, such as a microcontroller or microprocessor, can be provided to manage the electronic memory as well as the interaction between the FPGA or CPLD and the memory.

Alternatively, the CPU in the reconstruction device 114 can execute a computer program including a set of computer-readable instructions that perform the functions described herein, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OS and other operating systems known to those skilled in the art. Further, CPU can be implemented as multiple processors cooperatively working in parallel to perform the instructions.

In one implementation, the reconstructed images can be displayed on a display 116. The display 116 can be an LCD display, CRT display, plasma display, OLED, LED or any other display known in the art.

The memory 112 can be a hard disk drive, CD-ROM drive, DVD drive, FLASH drive, RAM, ROM or any other electronic storage known in the art.

After obtaining CT projection data, the CT imaging system using the reconstruction device 114 will perform image reconstruction using the projection data. As discussed in U.S. Pat. No. 7,751,524, incorporated herein by reference in its entirety, and in U.S. Pat. No. 6,907,100, incorporated herein by reference in its entirety, image reconstruction for short-scan cone-beam (CB) CT can be performed using a method similar to the filtered back projection (FBP) method for full-scan CB CT with a difference being that the projection data for short-scan CT are weighted according to the projection angle. This weighting of the projection data corrects for the unequal data redundancy of the short-scan data. For example, the Parker weights, among others, can be used for a half-scan (i.e., a scan of 180°+$\phi$, where $\phi$ is the fan angle).

Also, in one implementation, the Feldkamp method of can be used to reconstruct images from CB CT projection data. In the Feldkamp method, a convolution-backprojection formula is deduced for direct reconstruction of a three-dimensional density function from a set of two-dimensional projections. The Feldkamp method is approximate but has useful properties, including errors that are relatively small in many practical instances and a form that leads to convenient computation. The Feldkamp method reduces to the standard fan-beam formula in the plane that is perpendicular to the axis of rotation and contains the point source.

One challenge of the three-dimensional CB reconstruction problem is that CB data samples are not related to samples of the three-dimensional Radon transform in a direct and straight-forward manner. In this respect, the reconstruction problem fundamentally differs from that in two-dimensional fan-beam tomography: in the fan-beam scenario, data acquisition directly delivers two-dimensional Radon values so that reconstruction can be easily accomplished by using two-dimensional Radon inversion formulae with some minor modifications. In contrast to the two-dimensional fan beam reconstruction, a direct generalization using a three-dimensional Radon inversion formulae is not possible for the three-dimensional CB problem.

Some of the first methods suggested to achieve CB image reconstruction were based on approximate inversion formulae. Feldkamp, for instance, suggested a practical reconstruction approach for CB data acquired along a full circular source trajectory. Feldkamp's approach was derived as a heuristic generalization of the classical two-dimensional fan-beam reconstruction method; it possesses an efficient FBP scheme and has therefore been considered in various clinical applications. Over the years, many variations of the Feldkamp algorithm have been suggested, but these reconstruction approaches generally yield inexact results, and because they lack a thorough theoretical foundation, artifacts arising in the reconstruction results may present challenges. The early 1980s brought some significant breakthroughs in the analytical CB reconstruction theory. Advancements were mainly driven by the contributions of Tuy, Smith, and in particular by that of Grangeat.

One important issue in the context of three-dimensional CB image reconstruction is the question under which circumstances accurate reconstruction of the image $f$ is possible. Among several contributions to this issue, Tuy's formulation of the CB data sufficiency criterion has gained the most attention. Tuy's sufficiency criterion states that theoretically-exact and stable CB reconstruction at a point $(x,y,z)$ is only possible, if and only if almost every plane through $(x,y,z)$ has at least one intersection with the source trajectory. CB reconstruction in regions in which Tuy's sufficiency condition is not satisfied corresponds in general to an ill-posed problem, which cannot be solved in a simultaneously stable and exact way. The phrase "in general" here denotes that reconstruction is to be achieved for arbitrary objects $f$ and that no a priori information about the function $f$ is known.

Numerical algorithms for accurate CB reconstruction from data that satisfies Tuy's sufficiency condition can be composed by a direct implementation of, e.g., the Feldkamp method discussed above with the modifications developed by Grangeat. Applying the Grangeat formulation to each acquired CB projection successively delivers the intermediate Radon function throughout the three-dimensional Radon domain. The application of a three-dimensional Radon inversion algorithm on this intermediate result then yields, in a second step, the desired object density function. The shortcomings of these straight-forward methods are (1) that the second step can only be carried out after all CB projections have been processed, (2) that interpolation steps in the three-dimensional Radon domain are required, and (3) that all CB projections have to be non-truncated.

Subsequent research was thus focused on deriving CB reconstruction algorithms that follow the practical FBP scheme, where every CB projection can be processed immediately after it has been measured. Clack and Defrise and also Kudo and Saito both suggested schemes to find such FBP-type CB reconstruction algorithms for a variety of source trajectories. One important ingredient in these schemes is a weighting function, which needs to be adapted to the considered source trajectory and accounts for redundancies in the intermediate Radon function that can be obtained from the given CB data set. The resulting numerical CB reconstruction algorithms are based on a shift-variant filtering step and a subsequent three-dimensional weighted CB backprojection of the filtered data; these FBP methods allow accurate reconstruction, as long as the considered CB data is non-truncated and also satisfies Tuy's sufficiency condition. Additionally, it has been shown that the application of these schemes to a full circular source trajectory yields an algorithm that coincides with the one suggested by Feldkamp, thus setting that heuristically derived method into a firm theoretical framework.

Another breakthrough in CB reconstruction theory was achieved by Katsevich, who suggested, in 2003, a novel general scheme to derive image reconstruction algorithms for theoretically-exact reconstruction from CB data that satisfies Tuy's sufficiency condition. This scheme is related to the ones described in the previous paragraph, which also requires a proper definition of a redundancy weighting function to find a practical algorithm for a given source trajectory. In contrast, Katsevich's method enables the composition of FBP algorithms for many practically relevant scenarios. These FBP algorithms achieve data filtering by a shift-invariant one-dimensional convolution along specific filter directions. Therefore, these FBP algorithms are more efficient than conventional algorithms and in general more flexible with respect to truncation in the CB data, depending on the required filter directions. In recent years, a variety of attractive reconstruction algorithms have been derived from Katsevich's general theory, including: helical source trajectories, circle-plus-arc trajectories, and the ellipse-plus-oblique-line trajectory, to name only a few.

Figure 2:
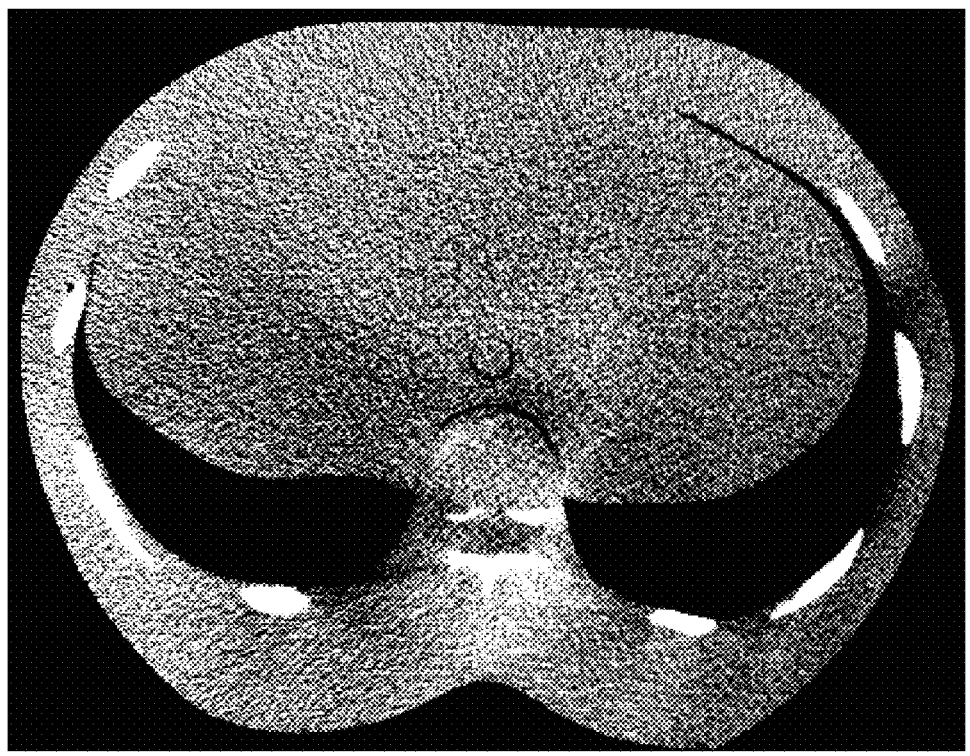
FIG. 2 shows a reconstructed image of half-scan projection data.
Figure 3:
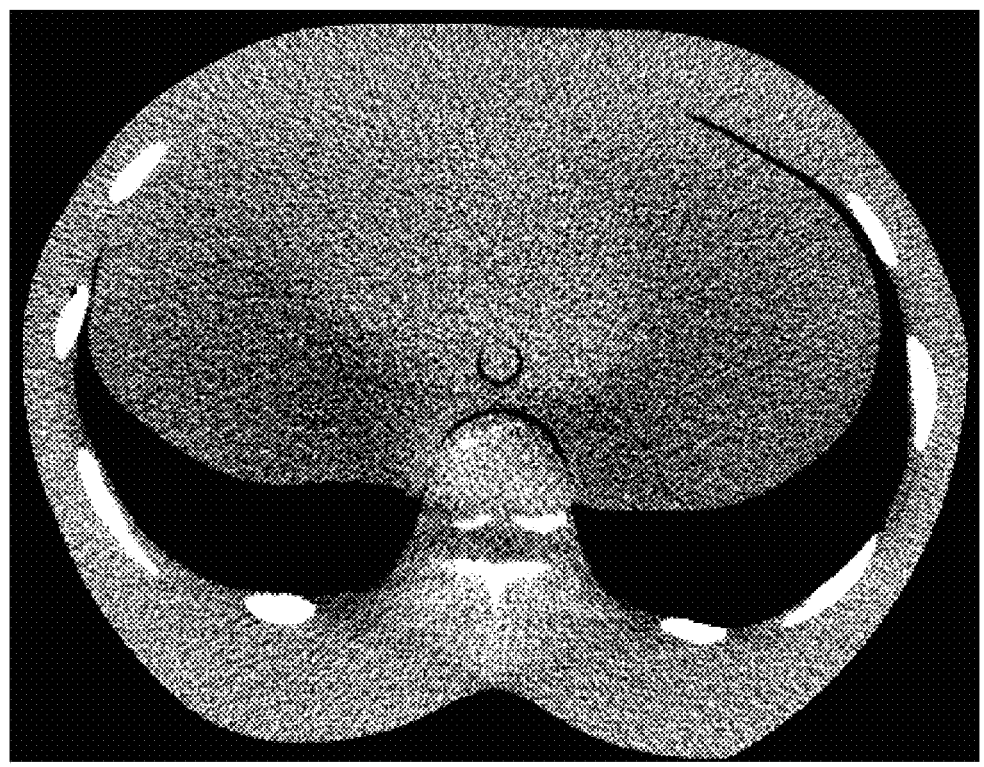
FIG. 3 shows a reconstructed image of full-scan projection data.

FIG. 2 shows a reconstructed CT image using half-scan CT without any additional corrections, and FIG. 3 shows a reconstructed CT image using full-scan CT. Compared with the full-scan image, the half-scan image exhibits significant shading artifacts toward the lower right side of the image. The lower right side of the image corresponds to the side of the imaged object OBJ opposite the X-ray source midway through the half-scan.

Figure 4:
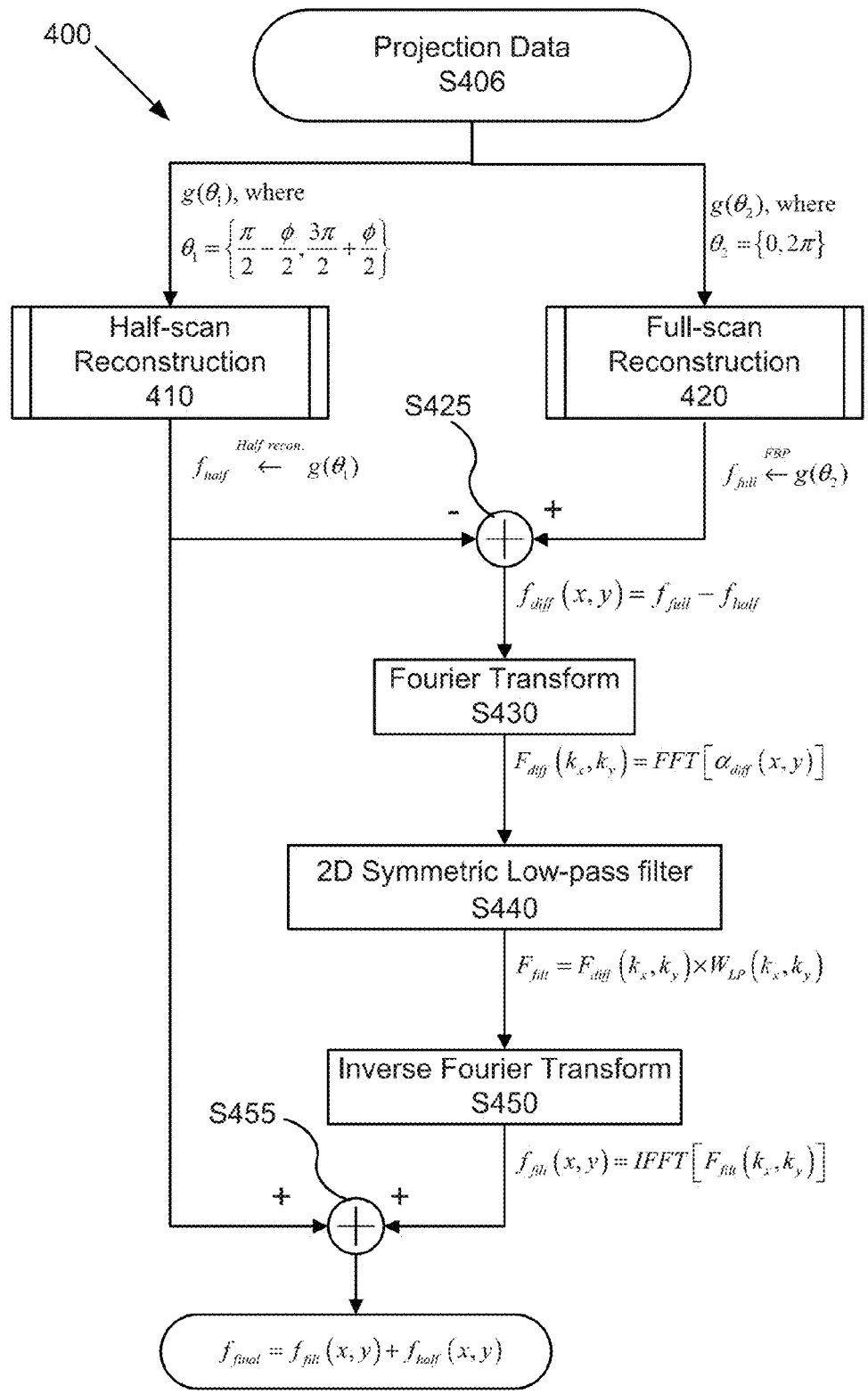
FIG. 4 shows a flow diagram of an implementation of a first symmetric method of reconstructing a half-scan image, wherein the half-scan image is the corrected using a full-scan image and a symmetric filter.

FIG. 4 shows a method 400 of correcting for the half-scan shading artifacts. The method 400 uses the low-spatial-frequency content from a full-scan image to correct for the shading artifact, but does not change the high-spatial-frequency content from the half-scan (i.e., the sharp edges), thus preserving the time resolution of the half-scan.

Method 400 begins by obtaining projection data at step S406. This projection data g(X,Y,θ) is fed into two different image reconstruction processes (i.e., process 410 and process 420), where X is the transverse position of the detector elements the detector unit 103, Y is the axial position of the detector elements the detector unit 103, and θ is a projection angle of the projection data. The axial direction is the travel direction of table 116 during a helical scan (i.e., the direction normal to the cross-sectional plane represented in FIG. 1). The transverse direction is the direction along the surface of the detector unit 103 orthogonal to the axial direction. In processes 410, projection data between the projection angles $\theta = 7\pi/2 - \phi/2$ and $\theta = 3\pi/2 + \phi/2$ is used to reconstruct a half scan image $f_{half}(x,y,z)$, where $\phi$ is the fan angle, where x and y are Cartesian coordinates corresponding to two dimensional slices through the image object OBJ. Further, z is the coordinate orthogonal to both x and y, corresponding to the axial direction of the image object OBJ. In processes 420, projection data between the projection angles θ=0 and θ=2π is used to reconstruct a full-scan image $f_{full}(x,y,z)$.

In step S425 of method 400 the full-scan image and half-scan image are combined to obtain their difference $$f_{diff}(x,y) = f_{full} - f_{half}.$$

In steps S430, S440, and S450 the difference image is filtered using a symmetric low-pass filter by transforming the difference image into the spatial-frequency domain, filtering the difference image (i.e., multiplying by the spectral windowing function), and then transforming the filtered difference image back into the spatial domain.

In step S430, the difference image is transformed into the spatial-frequency domain yielding a first intermediary result $$result_a(k_x, k_y, z) = FFT[f_{diff}(x,y,z)],$$

where FFT is the two-dimensional fast Fourier transform.

Next, in step S440 of method 400, the first intermediary result is filtered by multiplying the first intermediary result by a symmetric low-pass filter function $W_{LP}^{(sym.)}(k_x, k_y, z)$ yielding a second intermediary result $$result_b(k_x, k_y, z) = FFT[f_{diff}(x,y,z)] \times W_{LP}^{(sym.)}(k_x, k_y, z).$$

Next, in step S440 of method 400, the second intermediary result is transformed back into the frequency domain yielding the filtered difference image $$f_{filt}(x,y,z) = IFFT[FFT[f_{diff}(x,y,z)] \times W_{LP}^{(sym.)}(k_x, k_y, z)],$$

where IFFT represents the two-dimensional inverse fast Fourier transform.

In one implementation, the symmetric filter function is a Gaussian function, which is given by $$W_{LP}^{(sym.)}(k_x, k_y, z) = \frac{1}{\sqrt{2\pi}} \exp[-18(k_x^2 + k_y^2)/(w_{filt}(z) - 1)^2],$$

where the filter width $w_{filt}$ is given by $$w_{filt}(z) = w_0 \cos\left[\frac{3\pi}{4}\left(\frac{z - z_0}{\max(z) - \min(z)}\right)\right],$$

z is the position along the axial dimension, $z_0$ is the central axial position, and $w_0$ is a constant. This implementation assumes that the table 116 remains stationary, such that a helical scan is not performed.

In step S455, the filtered difference image is added to the half-scan image to correct for the shading artifact and to obtain the final result $$f_{final} = f_{filt}(x,y) + f_{half}(x,y).$$

Whereas in FIG. 4, method 400 performs the low-pass filtering by transforming to and from the spatial-frequency domain, one of ordinary skill in the art will recognize that the low-pass filtering can also be performed using a two-dimensional convolution in the spatial domain. Also, one of ordinary skill in the art will recognize that, in addition to the non-limiting exemplary embodiment using a Gaussian filter described herein, many other low-pass filter functions can be used instead of $W_{LP}^{(sym.)}(k_x, k_y, z)$, including: a Blackman window, a Hanning window, Hamming window, a Nuttall window, Blackman-Harris window, Bartlett-Hanning window, a Doph-Chebyshev window, and a Kaiser window.

One of ordinary skill will also recognize that the steps in method 400 can be rearranged without changing the final result. To understand how the steps of in method 400 can be rearranged, consider that the half-scan image and full-scan image can be expressed as $$f_{half} = R^{-1}[w_{half}(\theta) \times g(X,Y,\theta)], \text{ and}$$

$$f_{full} = R^{-1}[w_{full}(\theta) \times g(X,Y,\theta)],$$

where $R^{-1}[\bullet]$ is the inverse Radon transform and $w_{half}(\theta)$ and $w_{full}(\theta)$ are respectively the half-scan and the full-scan weighting functions as a function of projection angle (e.g., $w_{full}(\theta)$ can be the constant ½ and $w_{half}(\theta)$ can be given by the Parker weights). The filtered difference signal can then be written as $$f_{filt} = w_{LP}^{(sym.)} * R^{-1}[(w_{full} - w_{half}) \times g]$$
$$= R^{-1}[R[w_{LP}^{(sym.)}] * ((w_{full} - w_{half}) \times g)],$$

where $w_{LP}^{(sym.)} = FFT[W_{LP}^{(sym.)}]$ is the transformation of the symmetric low-pass filter into the spatial domain. The bottom expression results from the fact that the convolution between two inverse Radon transforms is equal to the inverse Radon transform of the convolution between their respective arguments. The final image can then be written as $$f_{final} = R^{-1}[w_{half} \times g + R[w_{LP}^{(sym.)}] * ((w_{full} - w_{half}) \times g)].$$

If filtered back projection is used to perform the inverse Radon transform and forward projection is used to perform the Radon transform, the above expression for the final image can be further simplified to $$f_{final} = FBP[F_{Ramp} * (w_{half} \times g) + F_{Ramp} * (FP[w_{LP}^{(sym.)}] * ((w_{full} - w_{half}) \times g))]$$

where FP is the forward-projection function and the filtered back projection is calculated using $FBP[g] = BP[F_{Ramp} * g]$ where BP is the back-projection function. The above expression for the final image $f_{final}$ reveals that the order of operations on the right-hand side can be modified into numerous permutations using the mathematical properties of the convolution, Radon transform, and multiplication and addition operations (e.g., the commutative property and associative property, etc.). Changing the order of operations correspond to switching the order of the steps in the flowchart shown in FIG. 4. Thus, there are many permutations of the flow diagram of the method 400.

Figure 5:
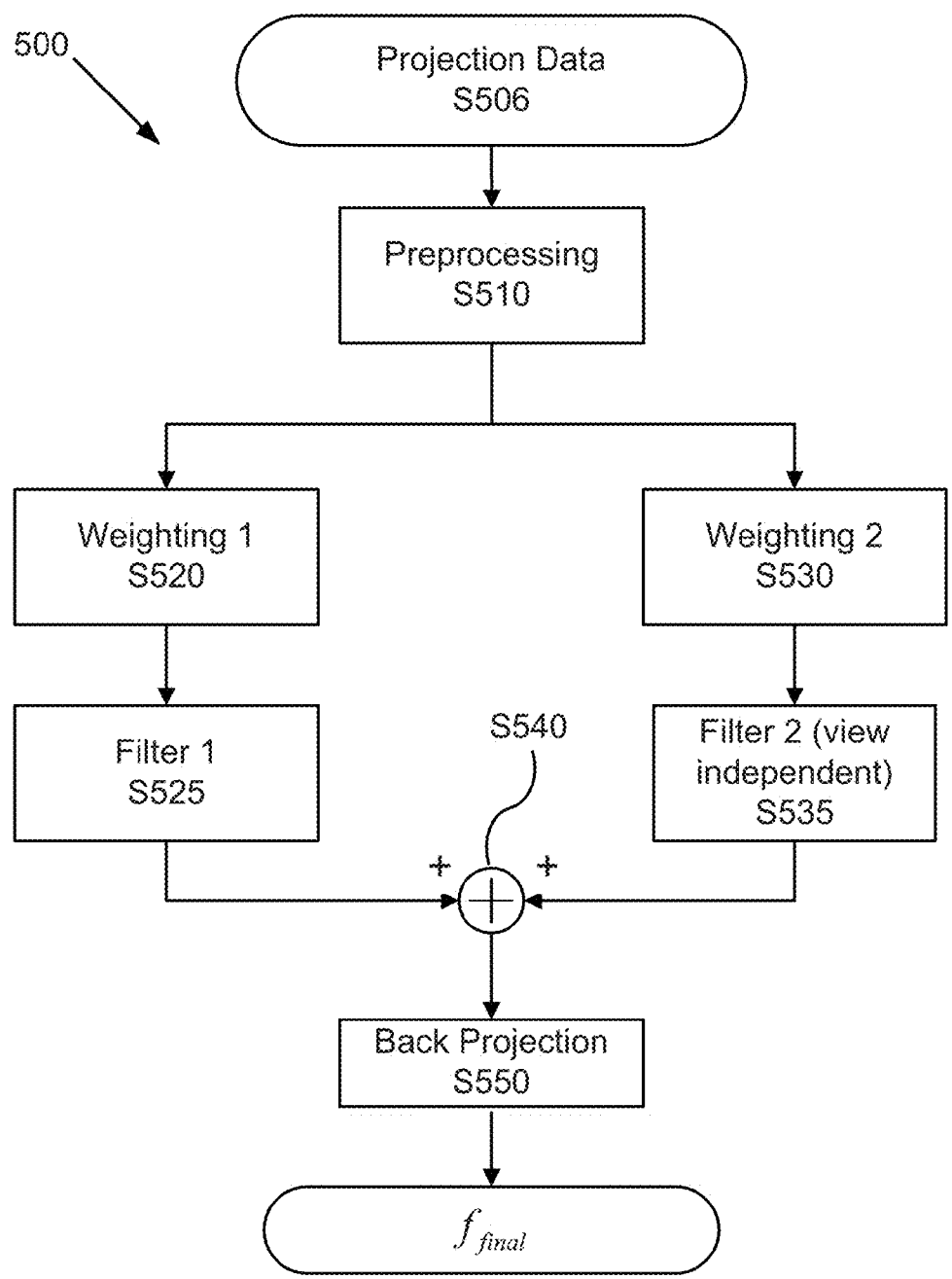
FIG. 5 shows a flow diagram of an implementation of a symmetric second method of reconstructing a half-scan image, wherein the half-scan image is the corrected using a full-scan image and a view-independent filter.

FIG. 5 shows a flow diagram of method 500, which is one example of a permutation of method 400 to minimize shading artifacts in half-scan CT images. Like method 400, method 500 obtains the final image $$f_{final} = FBP[F_{Ramp} * (w_{half} \times g) + F_{Ramp} * (FP[w_{LP}^{(sym.)}] * ((w_{full} - w_{half}) \times g))].$$

The first step S506 of method 500 obtains the projection data. The second step S510 of method 500 performs preprocessing of the projection data. For example, this preprocessing can include calibration corrections and corrections for nonlinearities arising from detector response. In one implementation, step S510 is omitted from method 500. In one implementation, step S510 is omitted because the preprocessing steps may have been previously performed on the data before it is obtained at step S506.

Referring to FIG. 5, after step S510, the projection data is bifurcated into two branches—a left branch and a right branch. The left branch corresponds to processing of half-scan data, and the right branch corresponds to processing the difference between full-scan data and half-scan data. With reference to the above expression for $f_{final}$, the right branch corresponds the right-most terms on the right-hand side of the expression for $f_{final}$, and the left branch corresponds the left-most terms on the right-hand side of the expression for $f_{final}$.

In the left branch, corresponding to steps S520 and S525 of method 500, the projection data is processed using a first set of weights $w_{half}$ and then the data is filtered using a first filter $F_{Ramp}$. The first weights $w_{half}$ are short-scan weights, such as the Parker weights for a half-scan, although any weights for a short scan can be used. In the non-limiting example illustrated in FIG. 5, the first weights $w_{half}$ correspond to a half-scan. In step S520 of method 500, the projection data is weighted according to its respective projection angle θ to obtain $$result_{1a}(X,Y,\theta) = w_{half}(\theta) \times g(X,Y,\theta).$$

In one implementation, the first weights can also be adjusted to correct for artifacts due to imbalance among the detector elements. For example, some detector elements of detector unit 103 may have a higher intrinsic gain than other detector elements of detector unit 103 or there may be other factors contributing to inequalities among the detection sensitivities of the detector elements of detector unit 103. The detector elements can by equilibrated by adjusting the values of the first weights $w_{half}$ to compensate for differences among the detector elements of detector unit 103. In one implementation, the detector equilibration terms are determined during pre-scan calibration measurement of the CT scanner.

Next, in step S525 of method 500, the weighted projection data is filtered. In one implementation using forward back projection, the filter function used in step S525 of method 500 is a ramp filter $F_{Ramp}$, resulting in an intermediary result given by $$result_{1b} = F_{Ramp} * (w_{half} \times g).$$

In the right branch of the method 500 bifurcation, corresponding to steps S530 and S535, the projection data is processed using a second set of weights and filtered using a view-independent filter.

In step S530 of method 500, the second weights are given the difference between the full-scan weights and the short/half-scan weights ($w_{full} - w_{half}$), resulting in an intermediary result given by $$result_{2a}(X,Y,\theta) = (w_{full}(\theta) - w_{half}(\theta)) \times g(X,Y,\theta)$$

Similar to the first weights, the second weights can include equilibration factors correcting for variation in the detector gains and other detector inequalities arising during the detection process.

Next, in step S535 of method 500, the weighted projection data is filtered using the view-independent filter. In one implementation, the second filter is convolution of a view-independent low-pass filter $f_{LP}^{(view\ indep)}$ and the ramp filter $F_{Ramp}$. This convolution yields a second filter function of the form $$F_2 = F_{Ramp} * f_{LP}^{(view\ indep)}$$

In one implementation, the view-independent low-pass filter $f_{LP}^{(view\ indep)}$ is the forward projection of the symmetric low-pass filter described in method 400, which is given by $$f_{LP}^{(view\ indep)} = FP[w_{LP}^{(sym.)}]$$

Thus, in step S525 of method 500, after the projection data is weighted using the difference weights, $w_{full} - w_{half}$ and the projection data is convolved with a low-pass filter function $F_{Ramp} * FP[w_{LP}^{(sym.)}]$ yielding the result $$result_{2b} = F_2 * ((w_{full} - w_{half}) \times g)$$
$$= (F_{Ramp} * FP[w_{LP}^{(sym.)}]) * ((w_{full} - w_{half}) \times g).$$

In one implementation of method 500, the view-independent low-pass filter $f_{LP}^{(view\ indep)}$ is given by a filter function directly, rather than being calculated as the forward projection of the symmetric low-pass filter.

In one implementation, independent low-pass filter $f_{LP}^{(view\ indep)}$ is given by the one-dimensional inverse Fourier transform of a one-dimensional Gaussian filter $$f_{LP}^{(view\ indep)}(X,Y) = IFFT_X[F_{LP}^{(view\ indep)}(k_X,Y)]$$

where $IFFT_X$ is the one-dimensional inverse Fourier transform along the X coordinate and the filter function $F_{LP}^{(view\ indep)}(k_X,Y)$ is given by $$F_{LP}^{(view\ indep)}(k_X,Y) = \frac{1}{\sqrt{2\pi}} \exp[-18k_X^2/(w_{filt}^{(2)}(Y)-1)^2],$$

wherein the filter width $w_{filt}^{(2)}$ is given by $$w_{filt}^{(2)}(Y) = w_0 \cos\left[\frac{3\pi}{4}\left(\frac{Y-Y_0}{\max(Y)-\min(Y)}\right)\right],$$

Y is the coordinate/index of the rows of detector unit 103 along the axial dimension, $Y_0$ is the coordinate/index of the central row, and $w_0$ is a constant. This implementation assumes that the table 116 remains stationary, such that a helical scan is not performed.

Step S540 of method 500 sums the first and second results from the two branches of method 500, and then, in step S550, the back-projection operation is performed on the combined result, yielding the final result, $f_{final}$, which is the half-scan image corrected for shading artifacts.

Figure 6:
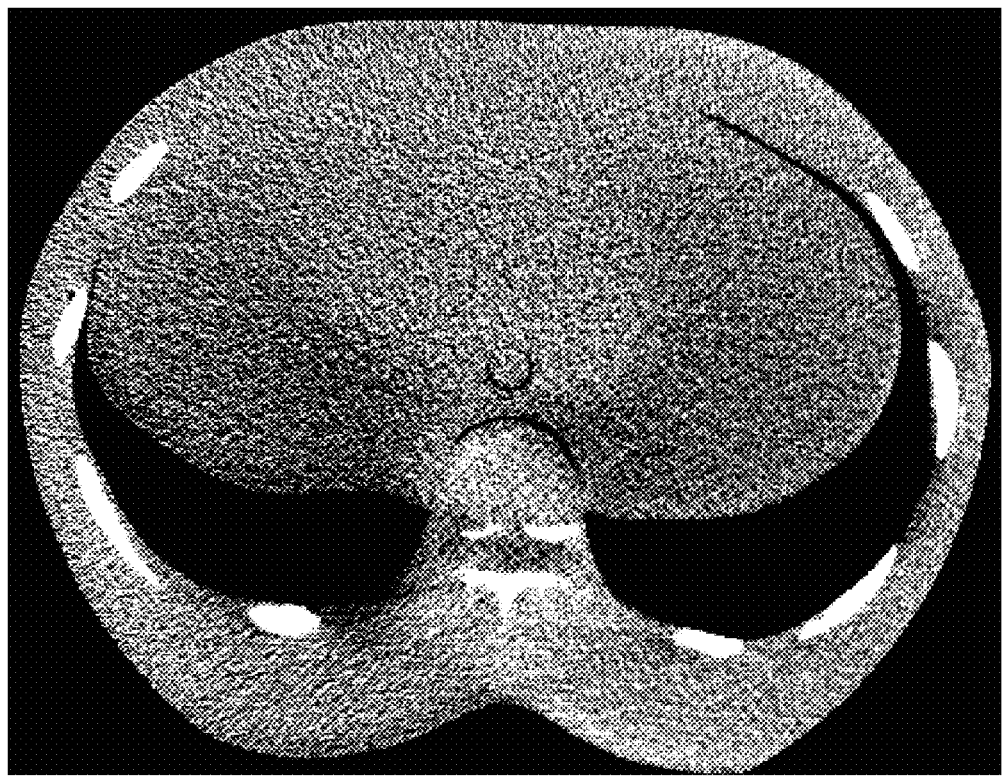
FIG. 6 shows a reconstructed half-scan image corrected for artifacts using the first symmetric method.

FIG. 6 shows a half-scan image that has been corrected for shading using method 400. Comparison with FIG. 2 reveals that much of the shading artifacts have been corrected, but comparison with FIG. 3 reveals residual shading artifacts are still present in the half-scan image shown in FIG. 6. The half-scan image obtained using either method 400 or method 500 is referred to as the symmetric-correction half-scan image.

Figure 7:
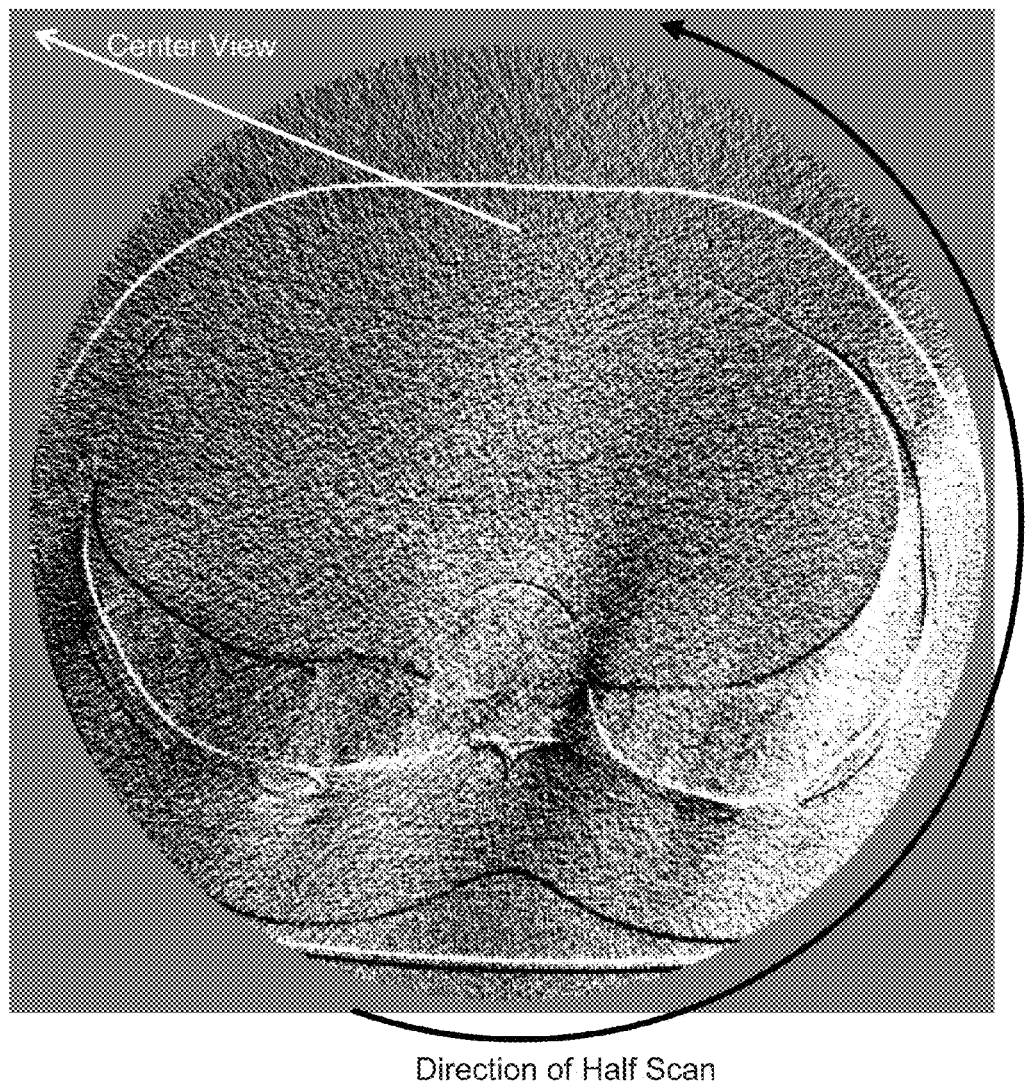
FIG. 7 shows an image of the difference between the full-scan image, as shown in FIG. 3, and the half-scan image corrected using the first symmetric method, as shown in FIG. 6.

FIG. 7 shows a difference image between the full-scan image and the symmetric-correction half-scan image. The white arrow shows the direction of the center view (i.e., the CB direction midway through a scan), and the black arrow shows the direction in which the X-ray source progresses around the image object OBJ during the scan. The streaks due to the shading effect run perpendicular to the direction of the center view. Therefore, the residual artifacts arise from the non-uniformity of the data redundancy.

Figure 8:
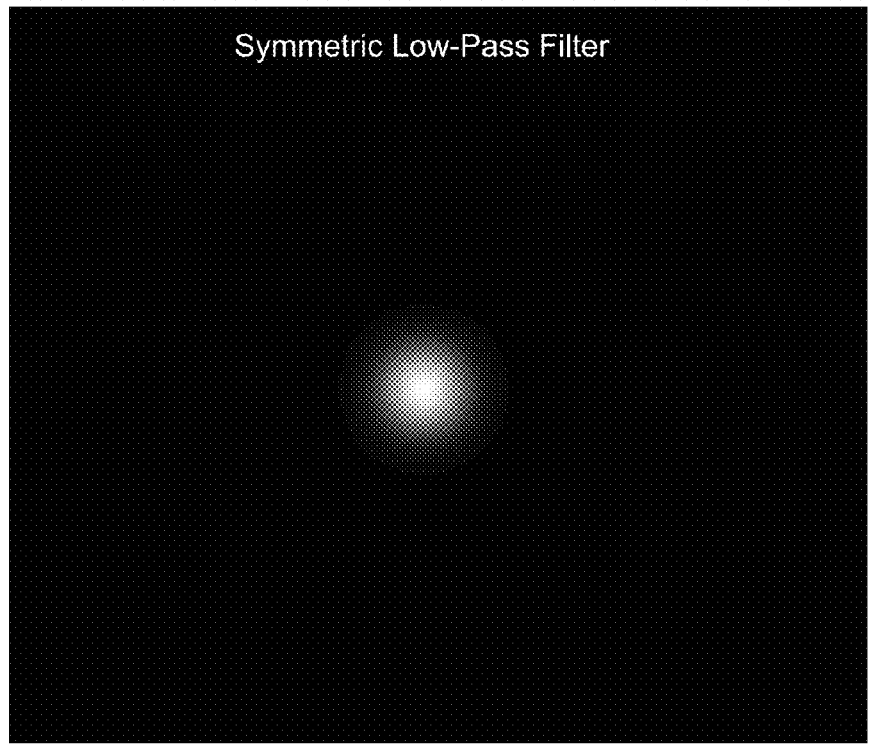
FIG. 8 shows an image of a symmetric low-pass filter and an image of an asymmetric low-pass filter.
Figure 8:
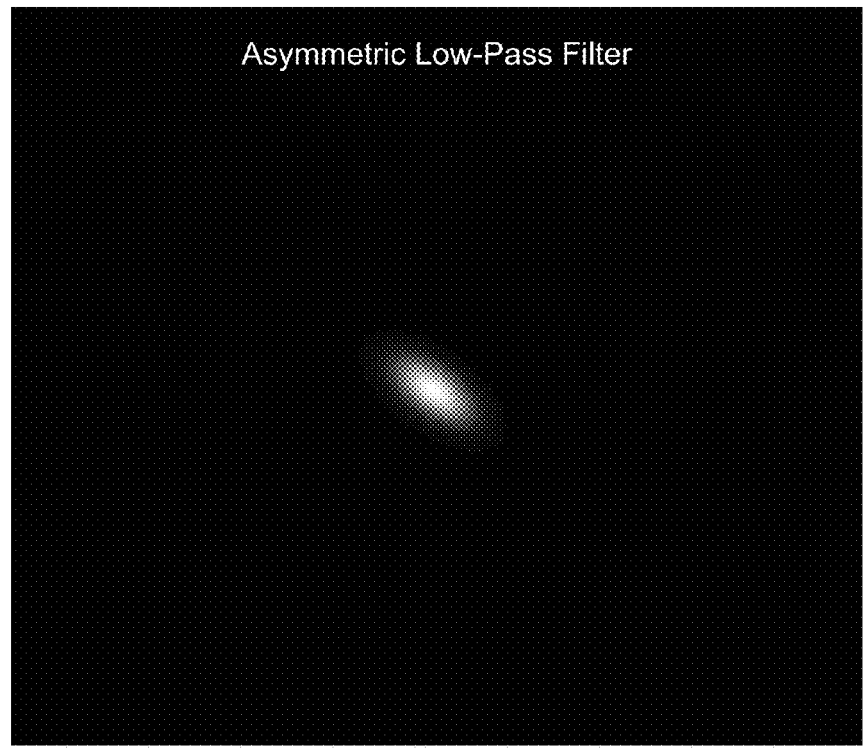

As shown in FIG. 8, the residual shading artifact can be minimized using an asymmetric low-pass filter $W_{LP}^{(asym.)}$ in place of the symmetric low-pass filter $W_{LP}^{(sym.)}$ used in step S440 of method 400. Similarly, in step S525 of method 500, the residual shading artifact can be minimized using a view-dependent low-pass filter $f_{LP}^{(view\ dep)}$ rather than a view-independent low-pass filter $f_{LP}^{(view\ indep)}$. As shown in FIG. 8, the asymmetric filter $W_{LP}^{(asym.)}$ is elongated along a primary axis coinciding with the direction of the center view (i.e., the major axis) and compressed along a second primary axis running in a direction perpendicular to the center view (i.e., the major axis). Thus, the asymmetric filter $W_{LP}^{(asym.)}$ disproportionately increases the high special-frequency contributions for the corrections applied to side-view projection data (i.e., projections near 90 degrees away from the center view) relative to the corrections applied to center-view projection data. In FIG. 8, the asymmetric low-pass filter is in the spatial frequency domain. In the spatial domain, the major and minor axes of the asymmetric filter are reversed.

In one implementation, the asymmetric filter used in place of the symmetric filter in step S440 of method 400 is a Gaussian function, which is given by $$W_{LP}^{(assym)}(k_x, k_y, z, \beta) = \frac{1}{\sqrt{2\pi}} \exp\left[-18(k_x^2 + k_y^2)/\left(w_{filt}^{(assym,1)}(k_x, k_y, z, \beta) - 1\right)^2\right],$$

where the asymmetric filter width $w_{LP}^{(asym,1)}$ is given by $$w_{fily}^{(asym,1)}(k_x, k_y, z, \beta) =$$
$$S_{filt}^{(1)}(k_x, k_y, \beta) \times \cos\left[\frac{3\pi}{4}\left(\frac{z - z_0}{\max(z) - \min(z)}\right)\right],$$
$$S_{filt}^{(1)}(k_x, k_y, \beta) = w_1 - (w_1 - w_0) \times |\sin(\tan^{-1}(k_y/k_x) - \beta)|,$$

z is the position along the axial dimension, $z_0$ is the central axial position, $\beta$ is the projection angle corresponding to the center view, and $w_0$ and $w_1$ are constants.

Figure 9:
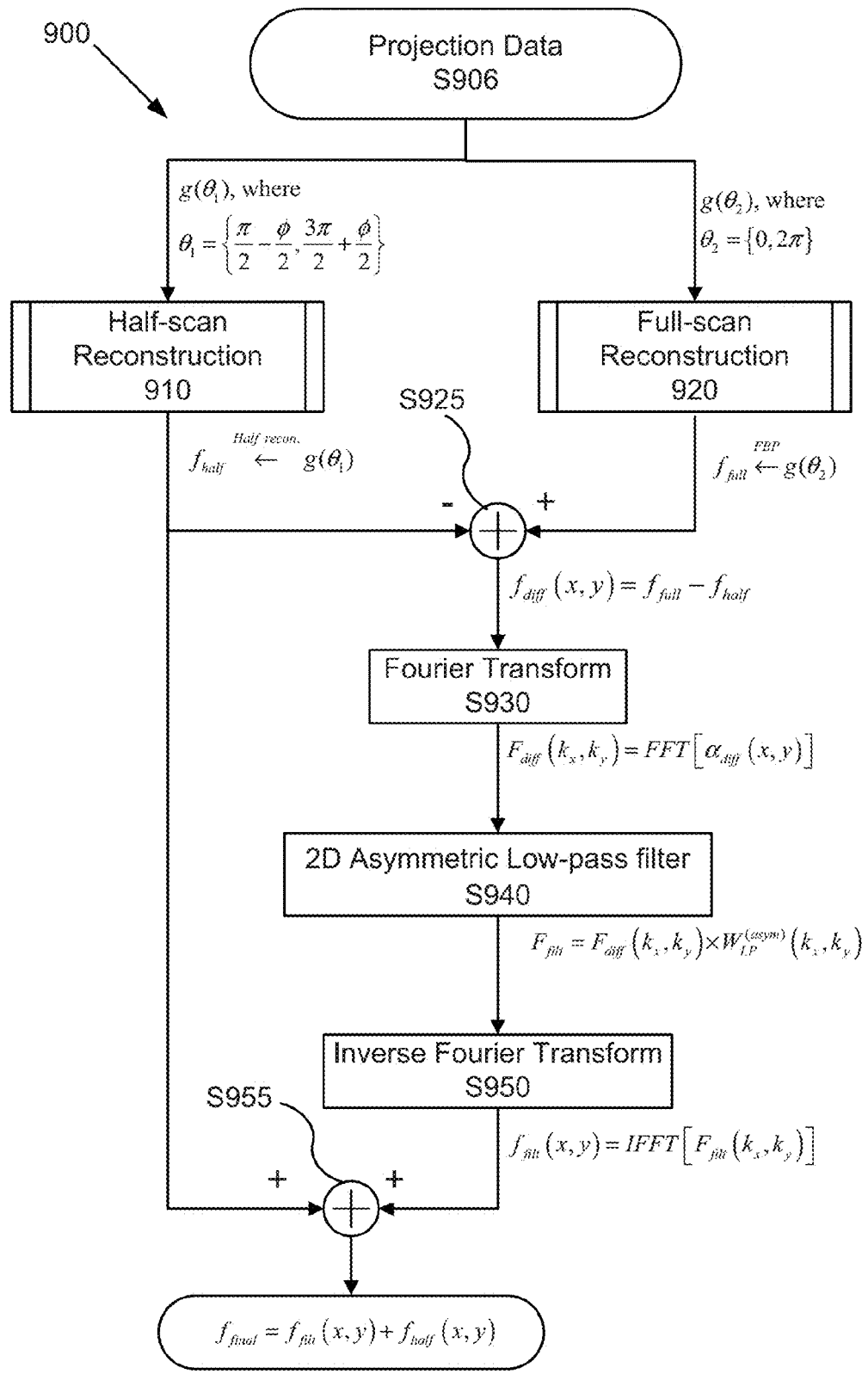
FIG. 9 shows a flow diagram of an implementation of a first asymmetric method of reconstructing a half-scan image, wherein the half-scan image is the corrected using a full-scan image and an asymmetric filter.

FIG. 9 shows a method 900 (similar to method 400) of correcting for the shading artifacts in a half-scan image using an asymmetric filter. The method 900 uses an asymmetric filter in step S940 of method 900, which is the primary difference between method 900 and method 400, in which a symmetric filter is used in step S440. Using an asymmetric filter improves the correction of the shading artifact while preserving the time resolution of the half-scan image.

Method 900 begins by obtaining projection data at step S906. This projection data $g(\theta)$ is fed into two different image reconstruction processes—processes 910 and 920. In process 910, projection data between the projection angles $\theta = \pi/2 - \phi/2$ and $\theta = 3\pi/2 + \phi/2$ is used to reconstruct a half-scan image $f_{half}$, where $\phi$ is the fan angle. In processes 920 projection data between the projection angles $\theta = 0$ and $\theta = 2\pi$ is used to reconstruct a full-scan image $f_{full}$.

Next, in step S925 of method 900, the full-scan image and half-scan image are combined to obtain their difference $$f_{diff}(X,Y) = f_{full} - f_{half}$$

Next, in steps S930, S940, and S950 of method 900, the difference image is filtered using an asymmetric low-pass filter by first transforming into the spatial-frequency domain in step S930, then, in step S940, multiplying the transformed difference image by an asymmetric window function centered at $k_x = k_y = 0$, and then, in step S950, converting the low-pass filtered difference image back into the spatial domain to obtain $$f_{filt}(x,y) = \text{IFFT}[\text{FFT}[f_{diff}(x,y)] \times W_{LP}^{(asym)}(k_x, k_y)],$$

where $W_{LP}^{(asym)}(k_x, k_y)$ is the asymmetric filter function in the spatial-frequency domain.

Next, at step S955 of method 900, the half-scan image and the filtered difference image are combined, yielding the final result, which is given by $$f_{final} = f_{filt}(x,y) + f_{half}(x,y)$$

Figure 10A:
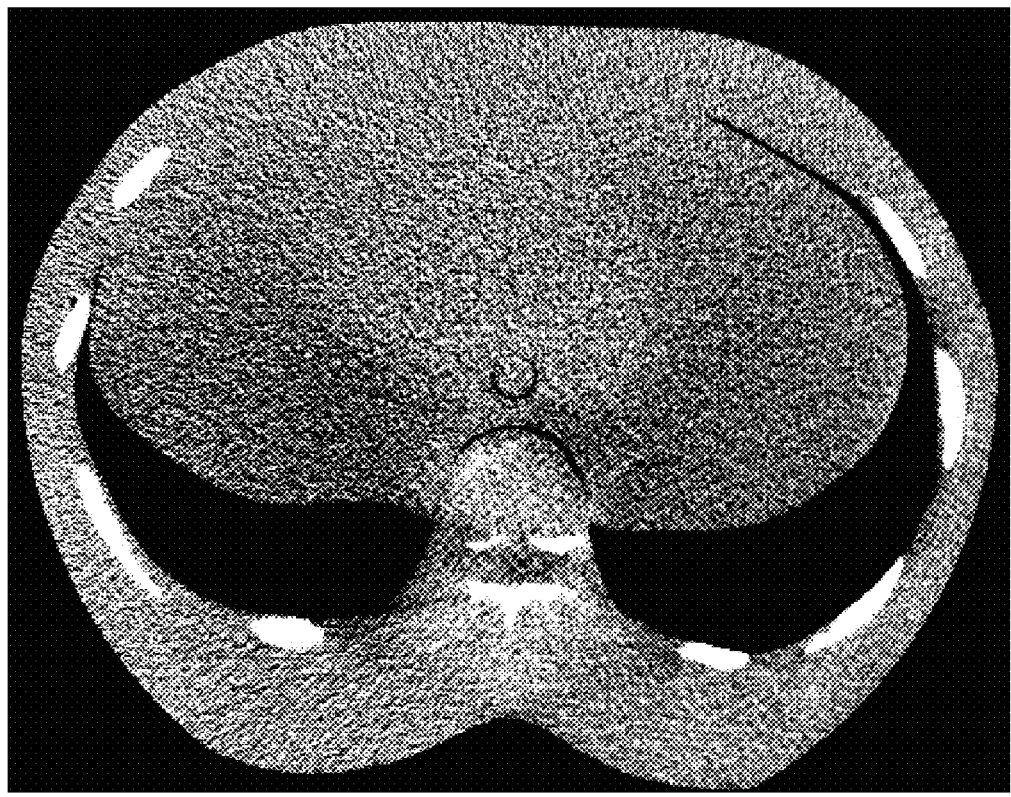
FIG. 10A shows a reconstructed half-scan image corrected for artifacts using the first asymmetric method.

FIG. 10A shows a half-scan image that has been corrected using the asymmetric-filter correction method 900. Comparison between FIG. 10A and FIG. 2 reveals that essentially all of the shading artifacts have been eliminated, as evidenced by the absence of the residual shading seen in the half-scan image in FIG. 3.

Figure 10B:
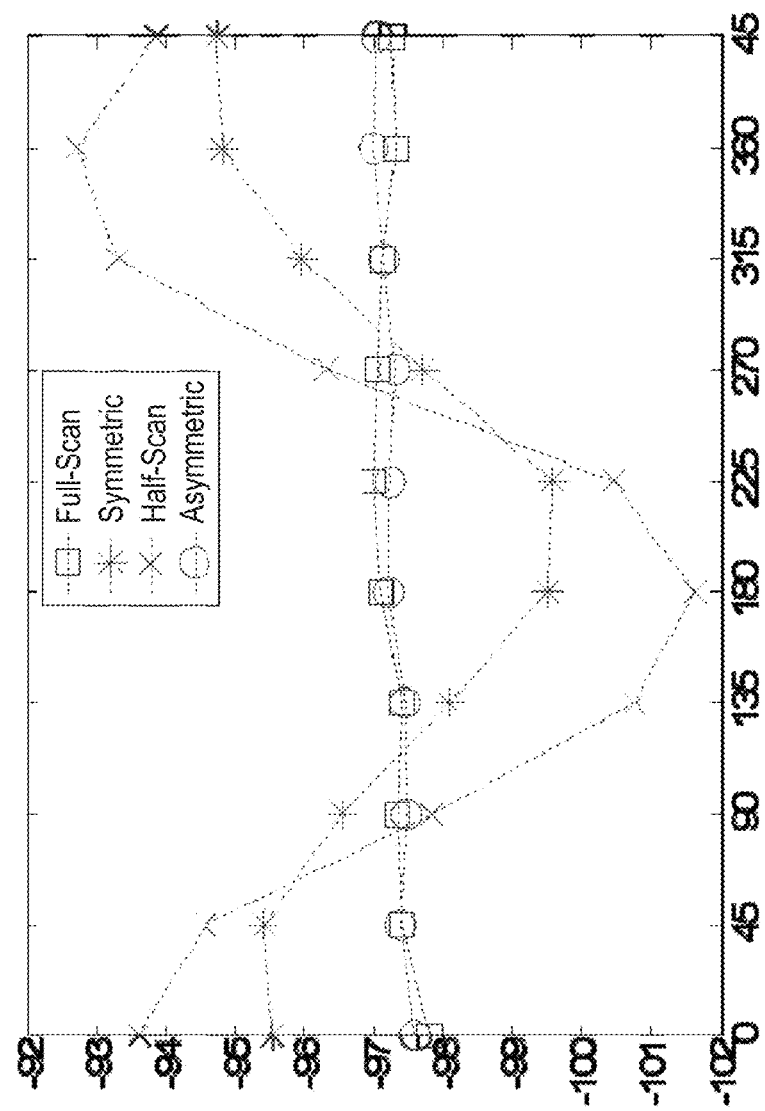
FIG. 10B shows a plot of the attenuation (vertical axis) of the center pixel of a reconstructed half-scan image as a function of the center-view projection angle (horizontal axis)

FIG. 10B shows a side-by-side comparison of results obtained using the four image-reconstruction methods shown in FIG. 2 (half-scan), FIG. 3 (full-scan), FIG. 6 (symmetric), and FIG. 10A (asymmetric). FIG. 10B shows the absorption of the central pixel of each image, plotted in terms of the Hounsfield units (vertical axis). Each image was reconstructed multiple times, incrementing the direction of the center view by 45° for each reconstructed image. The projection angle of the center view is plotted along the horizontal axis. For a perfectly reconstructed image, the attenuation of the central pixel is independent of the center-view angle.

Clearly, the full-scan reconstruction method, having uniform data redundancy, comes close to the ideal of producing a consistent attenuation value independent of the center-view angle. The un-corrected half-scan image exhibits significant oscillations in the attenuation value as a function of center-view angle. Given the large oscillatory shading artifacts in FIG. 2, this result is not surprising. The half-scan image corrected using the symmetric-filter method decreases the oscillations in attenuation, shown in FIG. 10B, but oscillations in attenuation as a function of center view angle are still clearly visible even after applying the symmetric-filter correction. Finally, the asymmetric-filter corrections to the half-scan image eliminate essentially all variation in the central pixel attenuation, showing near perfect agreement with the full-scan image results. Therefore, the asymmetric-filter corrections exhibit significant improvement over the symmetric-filter corrections.

Figure 11:
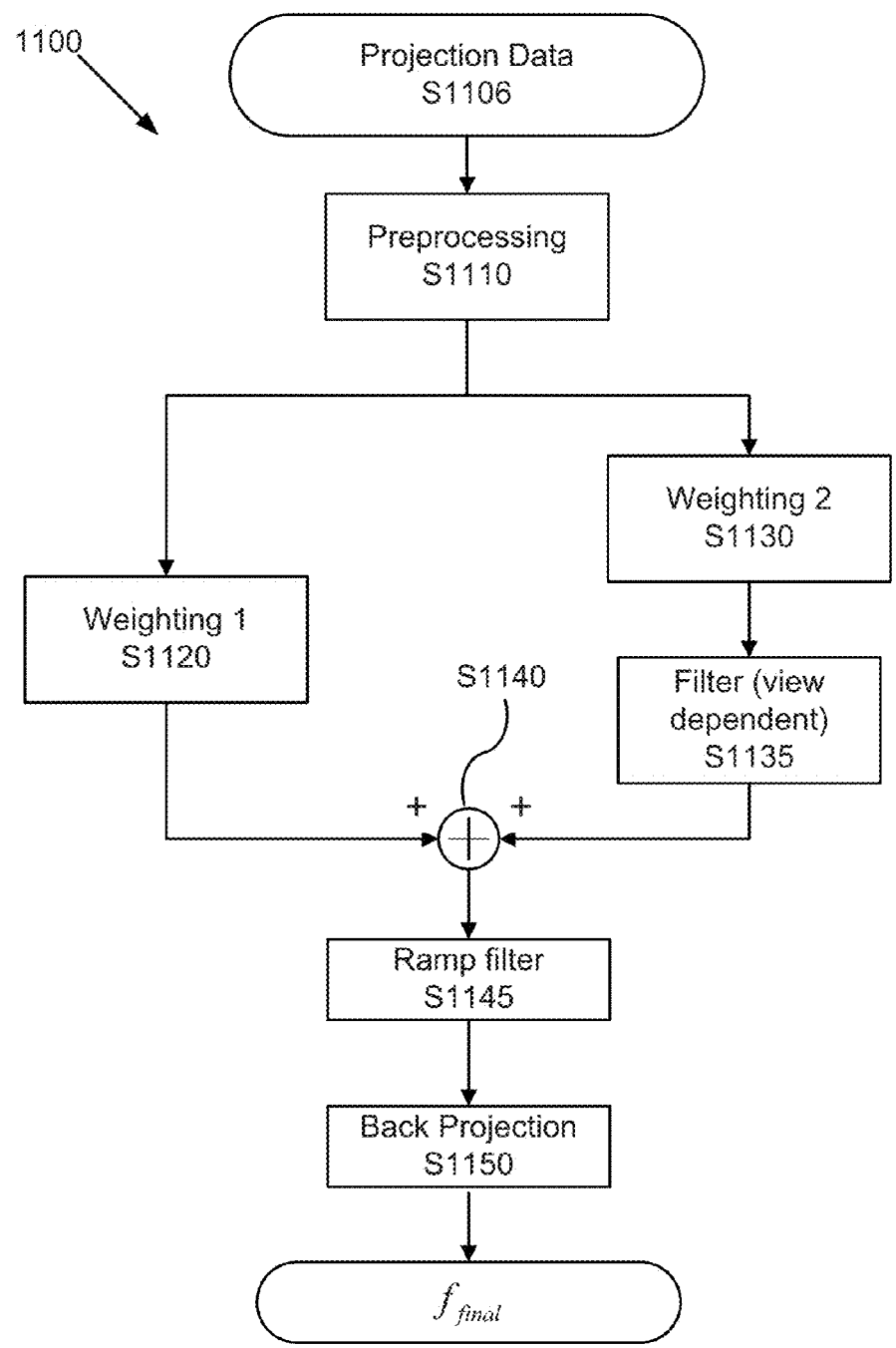
FIG. 11 shows a flow diagram of an implementation of an second asymmetric method of reconstructing a half-scan image, wherein the half-scan image is corrected using a full-scan image and a view-dependent filter.

FIG. 11 shows a method 1100 to obtain a half-scan image corrected for shading artifacts. Method 1100 corrects the half-scan data using a view-dependent filter to create a shading correction to the half-scan data.

Similar to method 500 shown in FIG. 5, method 1100 begins, in step S1106, by obtaining projection data. In one implementation, step S1106 is omitted and method 1100 begins instead by bifurcating into two branches.

Method 1100 bifurcates into two branches corresponding respectively to two weighting schemes for the projection data. In step S1120 (the left branch corresponding to a short-scan image), the projection data is weighted using a short-scan weighting function, e.g., the Parker weights or another short-scan weighting function. For simplicity of the nomenclature, the weighting function considered herein is assumed to be for a half-scan weighting function, but one of ordinary skill in the art will recognize that a short-scan weighting function that is not a half-scan weighting function can also be used. The result from the left branch (i.e., including step S1120 of method 1100) is given by $$\text{result}_1 = w_{half}(\theta) \times g(\theta)$$

where $w_{half}(\theta)$ is the half-scan weighting function, and $\theta$ is the projection angle.

The right branch of method 1100 begins, in step S1130, by applying a second set of weights to the projection data. This second set of weights corresponds to the difference between half-scan weights and full-scan weights, and is given by $$\text{result}_{2a} = (w_{full}(\theta) - w_{half}(\theta)) \times g(\theta),$$

where $w_{full}(\theta)$ is the full-scan weighting function. In a conventional filtered-back-projection image-reconstruction method, the weights for a full-scan are given by $w_{full}(\theta) = \frac{1}{2}$.

Next, in step S1135 of the right branch of method 1100, a view-dependent filter is applied to the difference-weighted projection data to obtain $$\text{result}_{2b} = f_{LP}^{(view\ dep.)}(X,Y,\beta) * [(w_{full}(\theta) - w_{half}(\theta)) \times g(X,Y,\theta)].$$

In one implementation, the view-dependent filter $f_{LP}^{(view\ dep.)}$, when expressed in the spatial domain, is compressed in the direction along the center view $\beta$ and is elongated in the direction perpendicular to the center view $\beta$ (i.e., the side-view direction).

In one implementation, the view-dependent filter is given by $$f_{LP}^{(view\ dep.)}(X,Y=z,\theta) = FP_\theta[IFFT[W_{LP}^{(asym)}(k_x,k_y,z,\beta)]],$$

where $FP_\theta$ is the forward projection along the projection angle $\theta = \tan^{-1}(k_y/k_x)$ and the axial coordinate Y of the detector unit 103 is related to the axial coordinate z of the reconstructed image.

In one implementation, the view-dependent filter is given by $$f_{LP}^{(view\ dep.)}(X,Y,\theta) = \frac{1}{\sqrt{2\pi}} \exp\left[-18X^2/\left(w_{filt}^{(asym,2)}(Y,\theta,\beta) - 1\right)^2\right],$$

where the asymmetric filter width $w_{filt}^{(asym,2)}$ is given by $$w_{filt}^{(assym,2)}(Y,\theta,\beta) = S_{filt}^{(2)}(\theta,\beta) \times \cos\left[\frac{3\pi}{4}\left(\frac{Y - Y_0}{\max(Y) - \min(Y)}\right)\right]$$

and where $$S_{filt}^{(2)}(\theta,\beta) = w_1 - (w_1 - w_0) \times |\sin(\theta - \beta)|.$$

Next, at step S1140 of method 1100, the result of the left branch result, is combined with the result of the right branch result$_{2b}$ to yield $$\text{result}_3 = w_{half}(\theta) \times g(\theta) + f_{LP}^{(view\ dep.)} * [(w_{full} - w_{half}) \times g].$$

Next, at step S1145 of method 1100, the result from step S1140 is filtered using a ramp filter, followed by back projection, at step S1150 of method 1100. After back projection in step S1150, the final half-scan image $f_{final}$ including the asymmetric filter correction is obtained.

In one implementation, the image reconstruction performed by filtered back projection at steps S1145 and S1150 can be replaced by other known methods of reconstructing CT images, including: iterative reconstruction methods (e.g., the algebraic reconstruction technique (ART) method and the total variation minimization regularization methods), Fourier-transform-based methods (e.g., direct Fourier method), and statistical methods (e.g., maximum-likelihood expectation-maximization algorithm based methods).

Figure 12:
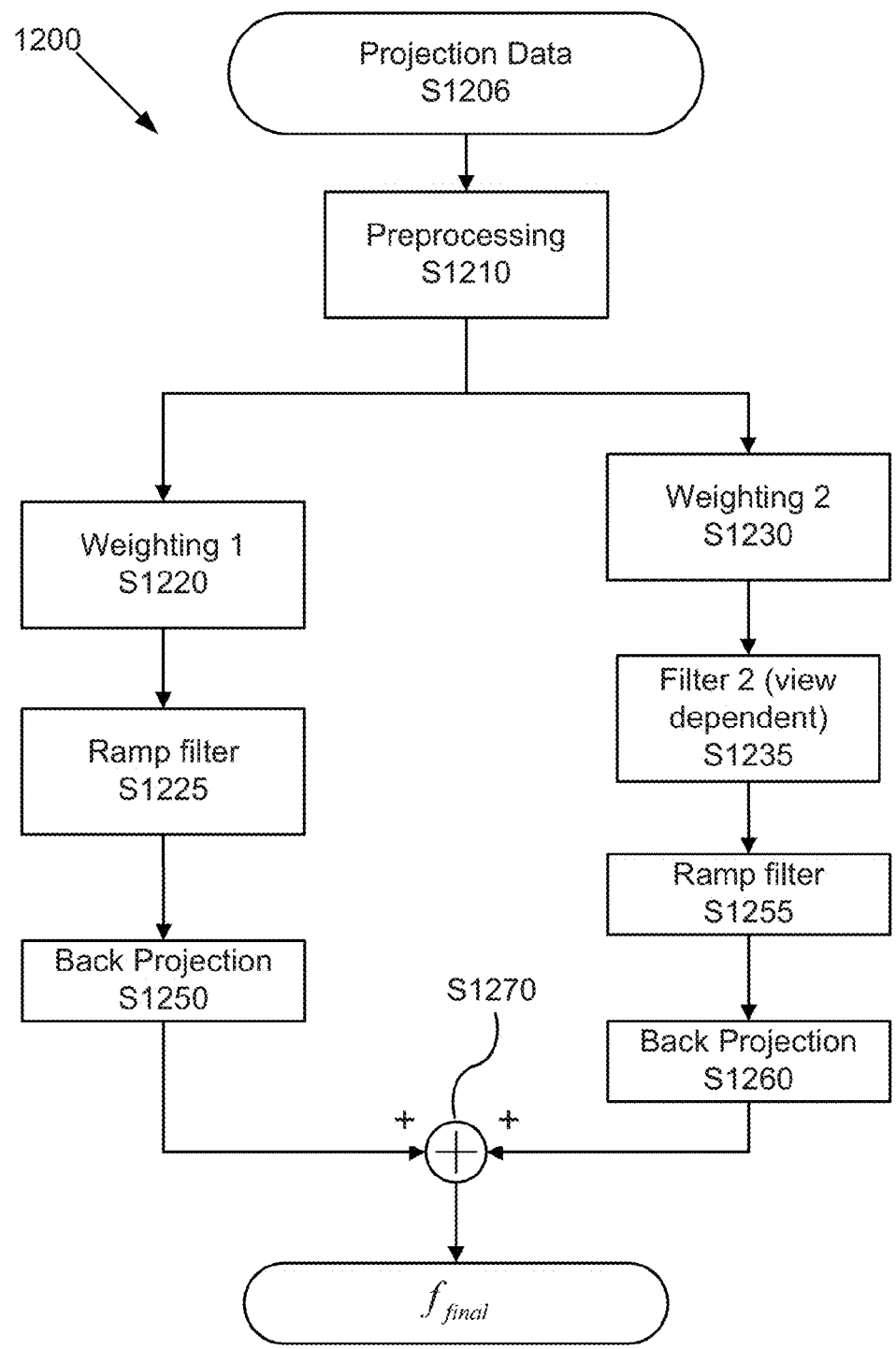
FIG. 12 shows a flow diagram of an implementation of an third asymmetric method of reconstructing a half-scan image, wherein the half-scan image is corrected using a full-scan image and a view-dependent filter.

FIG. 12 shows a flow diagram of a method 1200 of reconstructing a half-scan image using a view-dependent filter to calculate a shading correction for the half-scan image. In one implementation, this method is identical to method 1100, with the only difference being that the image reconstruction via filtered back projection is performed before combining the half-scan results of the left branch with the asymmetric filtered results of the right branch.

Figure 13:
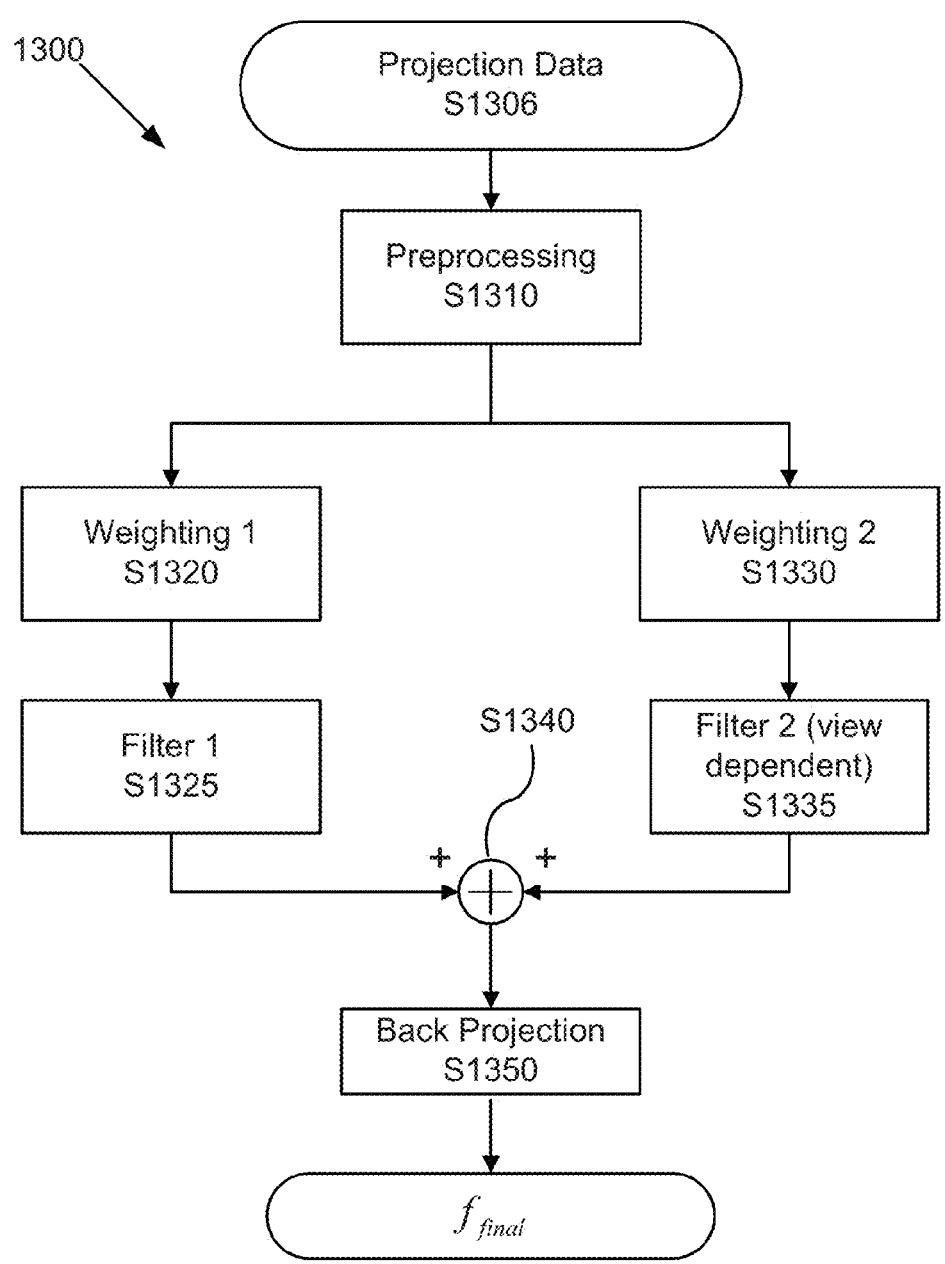
FIG. 13 shows a flow diagram of an implementation of a fourth asymmetric method of reconstructing a half-scan image, wherein the half-scan image is corrected using a full-scan image and a view-dependent filter.

FIG. 13 shows a flow diagram of a method 1300 of reconstructing a half-scan image using a view-dependent filter to calculate a shading correction for the image.

Similar to method 1100 shown in FIG. 11, method 1300 begins, in step S1306, by obtaining projection data. In one implementation, step S1306 is omitted and method 1300 begins instead by bifurcating into two branches.

Method 1300 bifurcates into two branches corresponding respectively to two weighting schemes for the projection data. In step S1320 (the left branch corresponding to a short-scan image), the projection data is weighted using a short-scan weighting function, e.g., the Parker weights or another short-scan weighting function. For simplicity of the nomenclature, the weighting function considered herein is assumed to be for a half-scan weighting function, but one of ordinary skill in the art will recognize that a short-scan weighting function that is not a half-scan weighting function can also be used. The result from the left branch (i.e., including step S1320 of method 1300) is given by $$\text{result}_{1a} = w_{half}(\theta) \times g(\theta)$$

where $w_{half}(\theta)$ is the half-scan weighting function, and $\theta$ is the projection angle.

Next, at step S1325, the weighted half-scan data is filtered using a first filter $F_1$. In one implementation, the first filter $F_1$ is a ramp filter used in filtered back projection. In this implementation, the result from step S1322 of method 1300 is given by $$\text{result}_{1a} = F_{Ramp} * (w_{half}(\theta) \times g(\theta)).$$

The right branch of method 1300 begins, in step S1330, by applying a second set of weights to the projection data. This second set of weights corresponds to the difference between half-scan weights and full-scan weights, and is given by $$\text{result}_{2a} = (w_{full}(\theta) - w_{half}(\theta)) \times g(\theta)$$

where $w_{full}(\theta)$ is the full-scan weighting function. In a conventional filtered-back-projection image-reconstruction method, the weights for a full-scan are given by $w_{full}(\theta) = \frac{1}{2}$.

Next, in step S1335 of the right branch of method 1300, a view-dependent filter is applied to the difference-weighted projection data to obtain $$\text{result}_{2b} = F_2(X,Y,\beta) * [(w_{full}(\theta) - w_{half}(\theta)) \times g(X,Y,\theta)].$$

In one implementation, the view-dependent filter is the convolution between a ramp filter and a view-dependent low-pass filter $f_{LP}^{(view\ dep.)}$. This view-dependent filter is given by $$F_2(X,Y,\beta) = F_{Ramp}(X,Y) * f_{LP}^{(view\ dep.)}(X,Y,\beta),$$

At step S1340 of method 1300, the results from the left and right branches of method 1300 are combined to create half-scan projection data corrected for shading artifacts and pre-filtered with a ramp filter. Because after step S1340 the corrected half-scan projection data has already been pre-filtered with a ramp filter, the only reconstruction step remaining in order to obtain a reconstructed image is the back projection step S1350.

Finally, in step S1350 of method 1300, the back projection operation is performed on the combined projection data to obtain a reconstructed image $f_{final}$.

While certain implementations have been described, these implementations have been presented by way of example only, and are not intended to limit the teachings of this disclosure. Indeed, the novel methods, apparatuses and systems described herein may be embodied in a variety of other forms; furthermore, various omissions, substitutions and changes in the form of the methods, apparatuses and systems described herein may be made without departing from the spirit of this disclosure.

The invention claimed is:

1. A computed-tomography (CT) apparatus, comprising:
a radiation source radiating radiation into an object space;
a plurality of detector elements configured to detect the radiation transmitted from the radiation source and through the object space, the plurality of detector elements configured to generate projection data;
a rotation mount configured to rotate the radiation source around the object space, wherein the radiation source is fixedly connected to the rotation mount; and
processing circuitry configured to
obtain the projection data representing an irradiance of the radiation detected at the plurality of detectors, the radiation having been transmitted through the object space,
reconstruct a full-scan image using the projection data,
reconstruct a short-scan image using the projection data,
generate a difference image by obtaining a difference between the full-scan image and the short-scan image,
filter the difference image using an asymmetric filter, which is defined by a function having at least one variable of a projection angle corresponding to a center view of a short-scan subset of the projection data, and
combine the filtered difference image with the short-scan image to obtain a corrected short-scan image.

2. The CT apparatus according to claim 1, wherein the processing circuitry is further configured to reconstruct the short-scan image using the projection data, which was obtained for a scan of projection angles that spans 180° plus a fan angle of the radiation.

3. The CT apparatus according to claim 2, wherein the processing circuitry is further configured to reconstruct the short-scan image by multiplying the projection data by Parker-weight coefficients having weighting values dependent on projection angles of the projection data.

4. The CT apparatus according to claim 1, wherein the processing circuitry is further configured to
filter the difference image using the asymmetric filter, wherein a filter shape of the asymmetric filter is one of a Gaussian window, a Blackman window, a Hanning window, a Hamming window, a Nuttall window, a Blackman-Harris window, a Bartlett-Hanning window, a Doph-Chebyshev window, and a Kaiser window.

5. The CT apparatus according to claim 1, wherein the processing circuitry is further configured to reconstruct the full-scan image using a filtered-backprojection method.

6. The CT apparatus according to claim 1, wherein the processing circuitry is further configured to
reconstruct the short-scan image, wherein the short-scan image is a half-scan image reconstructed from a half-scan subset of the projection data spanning projection angles of 180° plus a fan angle; and
filter the difference image using the asymmetric filter, wherein the asymmetric filter has a primary axis along a center view of the half-scan subset of the projection data.

7. The CT apparatus according to claim 6, wherein the processing circuitry is further configured to
filter the difference image using the asymmetric filter, which disproportionately decreases a high-spatial-frequency component of the difference image in a direction perpendicular to the center view of the half-scan subset of the projection data, and disproportionately increases a high-spatial-frequency component of the difference image in a direction parallel to the center view of the half-scan subset of the projection data.

8. The CT apparatus according to claim 1, wherein the processing circuitry is further configured to
calculate first weighted data by weighing the projection data using short scan weights;
calculate second weighted data by weighing the projection data using difference weights representing a difference between full-scan weights and the short-scan weights;
filter the second weighted data using a view-dependent filter, which is a low-pass filter, and a full-width half maximum of the view-dependent filter is largest for a projection angle of the short-scan weights corresponding to a center view of the short-scan weights;
reconstruct the image of the combined weighted data using the computed tomography image reconstruction method, which is a filtered back projection method; and
calculate the first weighted data using the short-scan weights, which are Parker weights.

9. The CT apparatus according to claim 8, wherein the processing circuitry is further configured to
filter the filtered second weighted data using a first ramp filter; and
filter the first weighted data using a second ramp filter.

10. A computed-tomography (CT) apparatus, comprising:
a radiation source radiating radiation into an object space;
a plurality of detector elements configured to detect the radiation transmitted from the radiation source and through the object space, the plurality of detector elements configured to generate projection data;
a rotation mount configured to rotate the radiation source around the object space, wherein the radiation source is fixedly connected to the rotation mount; and
processing circuitry configured to
obtain the projection data representing an irradiance of the radiation detected at the plurality of detectors, the radiation having been transmitted through the object space,
calculate first weighted data by weighting the projection data using short-scan weights,
calculate second weighted data by weighting the projection data using difference weights representing a difference between full-scan weights and the short-scan weights,
filter the second weighted data using a view-dependent filter, which is defined by a function having at least one variable of a projection angle corresponding to a center view of a short-scan subset of the projection data,
combine the first weighted data with the filtered second weighted data to obtain combined weighted data, and
reconstruct an image from the combined weighted data using a computed-tomography image reconstruction method.

11. The CT apparatus according to claim 10, wherein the processing circuitry is further configured to calculate the first weighted data using the short-scan weights, which are Parker weights.

12. The CT apparatus according to claim 10, wherein the processing circuitry is further configured to filter the second weighted data using the view-dependent filter, which is a low-pass filter, wherein a full-width half maximum of the view-dependent filter is largest for a projection angle corresponding to a center view of the short-scan weights.

13. The CT apparatus according to claim 12, wherein the processing circuitry is further configured to filter the second weighted data using the view-dependent filter, which has a shape that is one of a Gaussian window, a Blackman window, a Hanning window, a Hamming window, a Nuttall window, a Blackman-Harris window, a Bartlett-Hanning window, a Doph-Chebyshev window, and a Kaiser window.

14. The CT apparatus according to claim 10, wherein the processing circuitry is further configured to
filter the filtered second weighted data using a first ramp filter; and
filter the first weighted data using a second ramp filter.

15. The CT apparatus according to claim 10, wherein the processing circuitry is further configured to reconstruct the image from the combined weighted data using the computed tomography image reconstruction method, which is a filtered back projection method.

16. The CT apparatus according to claim 10, wherein the plurality of detector element are is fixedly connected to the rotation mount to rotate together with the radiation source around the object space or arranged stationary and separately from the rotation mount.

17. The CT apparatus according to claim 10, wherein the processing circuitry is further configured to
reconstruct a short-scan image, using the projection data corresponding to a scan of projection angles that piecewise spans 180° plus a fan angle of the radiation;
reconstruct a full-scan image using the projection data, wherein a method of reconstructing the full-scan image is a filtered-backprojection method;
generate a difference image by obtaining a difference between the full-scan image and the short-scan image
filter the difference image using the asymmetric filter having a primary axis along a center view of a half-scan subset of the projection data; and
combine the filtered difference image with the short-scan image to obtain a corrected short scan image.

18. An image-processing apparatus, comprising:
an interface configured to receive projection data representing an irradiance of radiation detected at a plurality of detectors; and
processing circuitry configured to
reconstruct a full-scan image using the projection data,
reconstruct a short-scan image using the projection data,
generate a difference image by obtaining a difference between the full-scan image and the short-scan image,
filter the difference image using an asymmetric filter, which is defined by a function having at least one variable of a projection angle corresponding to a center view of a short-scan subset of the projection data, and
combine the filtered difference image with the short-scan image to obtain a corrected short-scan image.

19. The image processing apparatus according to claim 18, wherein the processing circuitry is further configured to
reconstruct the short-scan image, wherein the short-scan image is a half-scan image reconstructed from a half-scan subset of the projection data spanning projection angles of 180° plus a fan angle; and
filter the difference image using the asymmetric filter having a primary axis along a center view of the half-scan subset of the projection data and which disproportionately decreases a high-spatial-frequency component of the difference image in a direction perpendicular to the center view of the half-scan subset of the projection data, and disproportionately increases a high-spatial-frequency component of the difference image in a direction parallel to the center view of the half-scan subset of the projection data.

* * * * *